United States Patent [19]
Hoffa

[11] Patent Number: 5,469,763
[45] Date of Patent: Nov. 28, 1995

[54] WIRE AND CABLE PROCESSING SYSTEM

[75] Inventor: Jack L. Hoffa, Brea, Calif.

[73] Assignee: Eubanks Engineering Company, Monrovia, Calif.

[21] Appl. No.: 148,568

[22] Filed: Nov. 8, 1993

Related U.S. Application Data

[63] Continuation-in-part of Ser. No. 22,981, Feb. 25, 1993, Pat. No. 5,375,485, which is a continuation-in-part of Ser. No. 857,972, Mar. 26, 1992, Pat. No. 5,293,683, which is a continuation-in-part of Ser. No. 659,557, Feb. 22, 1991, abandoned, which is a continuation-in-part of Ser. No. 611,057, Nov. 9, 1990, Pat. No. 5,146,673.

[51] Int. Cl.$^6$ .................................................... H02G 1/12
[52] U.S. Cl. .......................... 81/9.51; 29/825; 29/564.4
[58] Field of Search .................................. 81/9.51, 9.42, 81/9.41; 29/564.4, 564.3, 564.6, 825

[56] References Cited

U.S. PATENT DOCUMENTS

| | | |
|---|---|---|
| 1,433,320 | 10/1922 | Wersel . |
| 1,477,678 | 12/1923 | Wetmore . |
| 2,523,936 | 9/1950 | Axelsen . |
| 2,645,959 | 7/1953 | Fuchs et al. . |
| 2,671,363 | 3/1954 | Wells . |
| 2,722,145 | 11/1955 | Schulenburg . |
| 2,765,685 | 10/1956 | Stratman et al. . |
| 2,811,063 | 10/1957 | Eubanks . |
| 2,880,635 | 4/1959 | Harris . |
| 2,934,982 | 5/1960 | Eubanks . |
| 3,176,550 | 4/1965 | Marcotte . |
| 3,222,957 | 12/1965 | Kramer et al. . |
| 3,292,462 | 12/1966 | Turecek et al. . |
| 3,309,948 | 3/1967 | Falken . |
| 3,368,428 | 2/1968 | Gudmestad . |
| 3,376,627 | 4/1968 | Sitz . |
| 3,479,718 | 11/1969 | Van De Kerkhof et al. . |
| 3,552,449 | 1/1971 | Woodward et al. . |
| 3,570,100 | 3/1971 | Kindell et al. . |
| 3,604,291 | 9/1971 | Weidner . |
| 3,612,111 | 10/1971 | Meyer . |
| 3,614,905 | 11/1971 | Bieganski . |
| 3,645,156 | 2/1972 | Meyer et al. . |
| 3,653,412 | 4/1972 | Gudmestad . |
| 3,701,301 | 10/1972 | Gudmestad . |

(List continued on next page.)

FOREIGN PATENT DOCUMENTS

| | | |
|---|---|---|
| 2525402 | 4/1982 | France . |
| 2525403 | 7/1984 | France . |
| 2513478 | 2/1985 | France . |
| 1084799 | 1/1959 | Germany . |
| 2927235 | 8/1980 | Germany . |
| 0423443 | 7/1990 | Germany . |
| 3926782 | 12/1990 | Germany . |
| 1216815 | 3/1986 | U.S.S.R. . |
| 1293779 | 2/1987 | U.S.S.R. . |
| 609834 | 10/1948 | United Kingdom . |

OTHER PUBLICATIONS

Standard Logic Catalogue, "EWS–6K Electronic Wire Stripper", Feb. 1974.
Artos Catalog Sheet, "Single Blade, Fully–Automatic Wire Processing", 1989.
Komax 33 Catalogue Sheet, 1988.

*Primary Examiner*—D. S. Meislin
*Attorney, Agent, or Firm*—William W. Haefliger

[57] ABSTRACT

A wire processing apparatus wherein wire is moved endwise along a travel path comprising a primary wire processing blade pair including first and second blades at opposite sides of the wire travel path; a secondary wire processing blade pair including third and fourth blades at opposite sides of the wire travel path; drive structure; and structure operatively connected between the drive structure and the blade pairs, and operatively intercoupling the first and third blades, and also operatively intercoupling the second and fourth blades, and responsive to operation of the drive structure to cause the first blade to be displaced toward the path as the third blade is displaced away from the path, and to cause the second blade to be displaced toward the path as the fourth blade is displaced away from the path.

56 Claims, 10 Drawing Sheets

U.S. PATENT DOCUMENTS

| | | |
|---|---|---|
| 3,769,681 | 11/1973 | Eubanks . |
| 3,838,612 | 10/1974 | Inami . |
| 3,857,306 | 12/1974 | Gudmestad . |
| 3,857,313 | 12/1974 | Endo . |
| 3,869,781 | 3/1975 | Eubanks et al. . |
| 3,872,584 | 3/1975 | Chick et al. . |
| 3,881,374 | 5/1975 | Gudmestad . |
| 3,918,330 | 11/1975 | Blaha . |
| 3,921,472 | 11/1975 | Gudmestad et al. . |
| 3,927,590 | 12/1975 | Gudmestad et al. . |
| 4,009,738 | 3/1977 | Baba et al. . |
| 4,027,557 | 6/1977 | Stepan . |
| 4,091,695 | 5/1978 | Funcik et al. . |
| 4,112,791 | 9/1978 | Wiener . |
| 4,156,961 | 6/1979 | Agoh . |
| 4,164,808 | 8/1979 | Gudmestad et al. . |
| 4,165,768 | 8/1979 | Gudmestad . |
| 4,166,315 | 9/1979 | Gudmestad et al. . |
| 4,175,316 | 11/1979 | Gudmestad . |
| 4,194,281 | 3/1980 | Gudmestad . |
| 4,238,981 | 12/1980 | Karl . |
| 4,244,101 | 1/1981 | Talley . |
| 4,261,230 | 4/1981 | Sindelar . |
| 4,266,455 | 5/1981 | Ago . |
| 4,275,619 | 6/1981 | Shimizu . |
| 4,327,609 | 5/1982 | Resch . |
| 4,350,061 | 9/1982 | Isham et al. . |
| 4,364,289 | 12/1982 | Sorensen . |
| 4,370,786 | 2/1983 | Butler . |
| 4,403,383 | 9/1983 | Dewhurst et al. . |
| 4,428,114 | 1/1984 | Teagno . |
| 4,446,615 | 5/1984 | Talley . |
| 4,493,233 | 1/1985 | Dusel et al. . |
| 4,502,586 | 3/1985 | Duesel et al. . |
| 4,521,946 | 6/1985 | Dusel et al. . |
| 4,543,717 | 10/1985 | Luka . |
| 4,581,796 | 4/1986 | Fukuda et al. . |
| 4,584,912 | 4/1986 | Gudmestad et al. . |
| 4,597,179 | 7/1986 | Goforth . |
| 4,601,093 | 7/1986 | Cope . |
| 4,631,822 | 12/1986 | Reinertz . |
| 4,638,558 | 1/1987 | Eaton . |
| 4,699,027 | 10/1987 | Guyette et al. . |
| 4,713,880 | 12/1987 | Dusel et al. . |
| 4,738,019 | 4/1988 | Kawaguchi . |
| 4,745,828 | 5/1988 | Stepan . |
| 4,802,512 | 2/1989 | Kodera . |
| 4,827,592 | 5/1989 | Kodera . |
| 4,833,778 | 5/1989 | Loustau . |
| 4,838,129 | 6/1989 | Cope . |
| 4,869,135 | 9/1989 | Hoffa . |
| 4,932,110 | 6/1990 | Tanaka . |
| 4,942,789 | 7/1990 | Hoffa et al. . |
| 5,016,347 | 5/1991 | Okazaki et al. . |
| 5,067,379 | 11/1991 | Butler et al. . |
| 5,109,598 | 5/1992 | Koch . |
| 5,142,950 | 9/1992 | Takano et al. . |
| 5,146,673 | 9/1992 | Hoffa . |
| 5,188,213 | 2/1993 | Koch . |
| 5,199,328 | 4/1993 | Hoffa . |
| 5,235,735 | 8/1993 | Koch . |
| 5,368,212 | 11/1994 | Koch . |

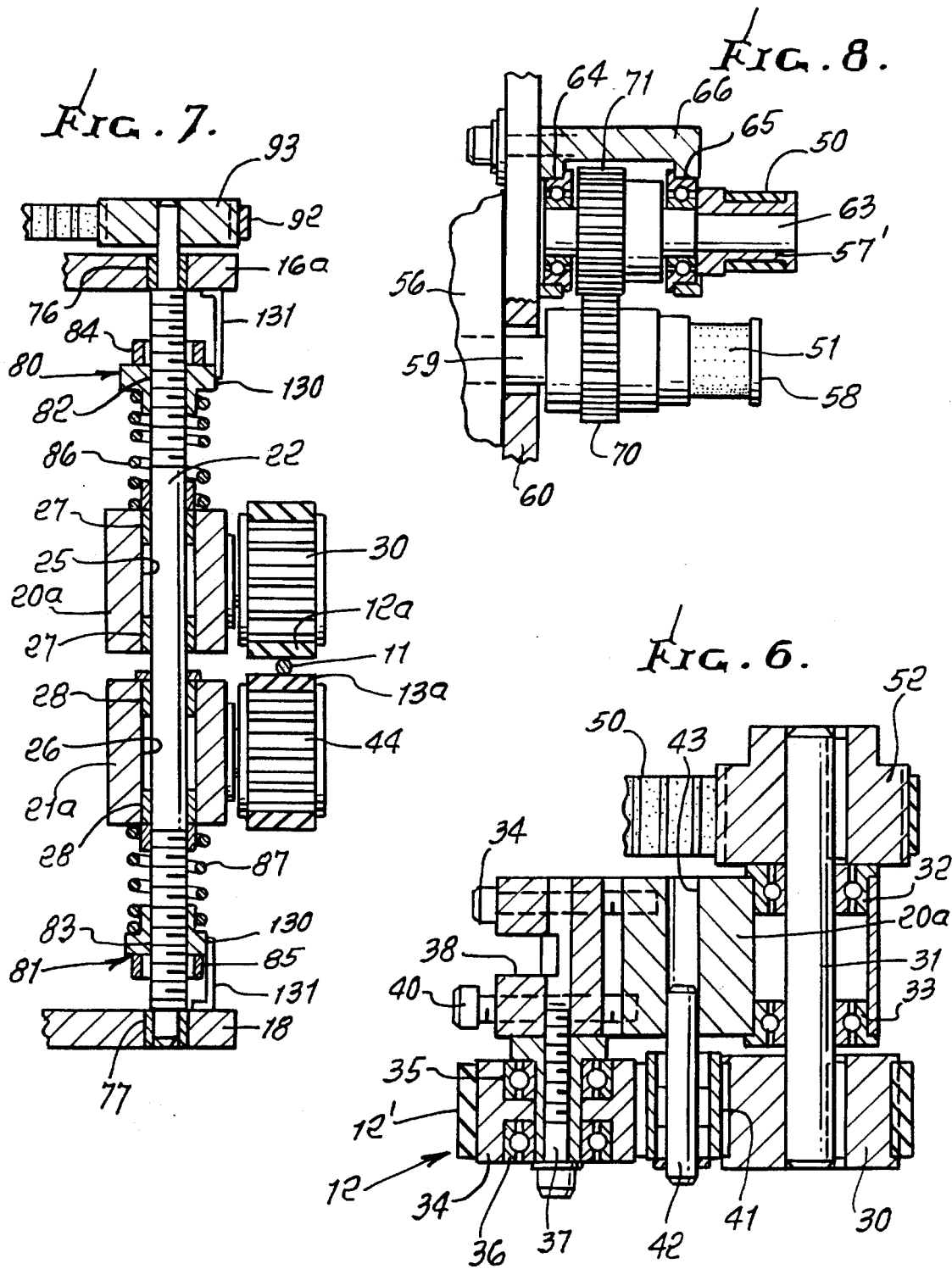

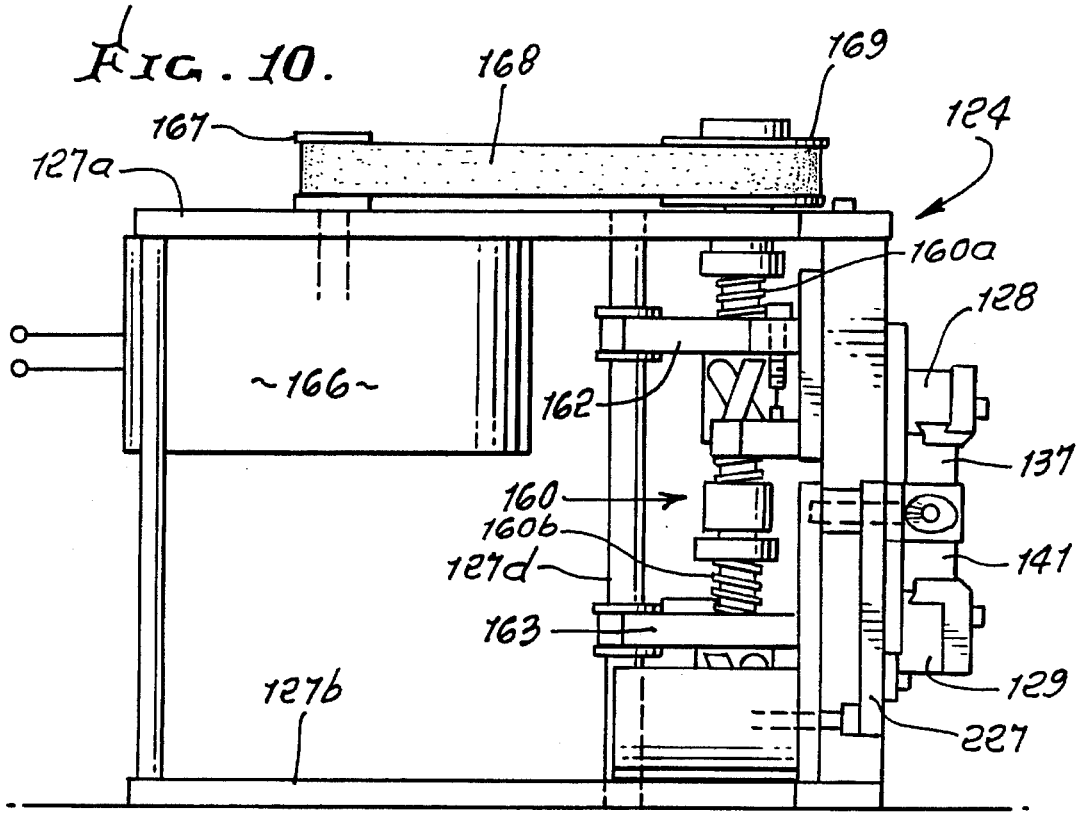
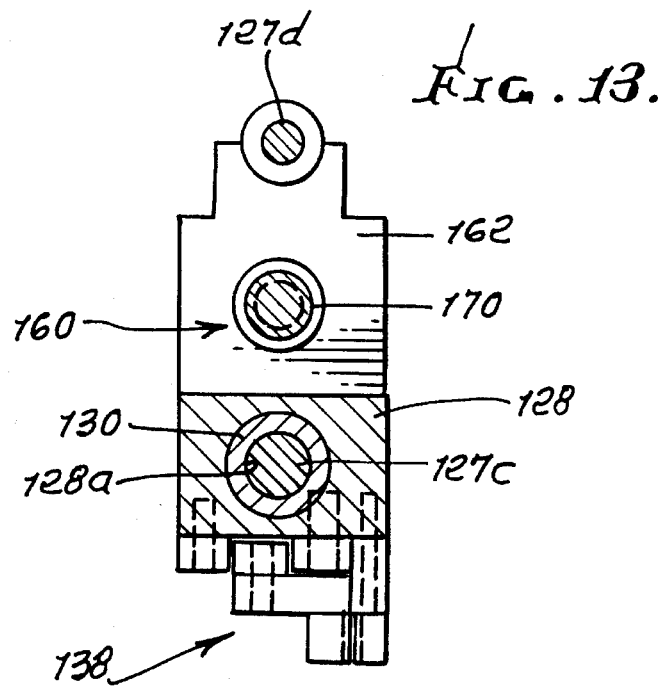

WIRE AND CABLE PROCESSING SYSTEM

This application is a continuation-in-part of Ser. No. 08/022,981 filed Feb. 25, 1993, now U.S. Pat. No. 5,375,485, which is a continuation-in-part of Ser. No. 07/857,972 filed Mar. 26, 1992, now U.S. Pat. No. 5,293,683, which is a continuation-in-part of Ser. No. 07/659,557 filed Feb. 22, 1991, now abandoned which is a continuation-in-part of Ser. No. 07/611,057 filed Nov. 9, 1990, now U.S. Pat. No. 5,146,673 issued Sep. 15, 1992.

BACKGROUND OF THE INVENTION

This application relates generally to wire or cable severing, as well as stripping sheathing from severed wire, and controllable endwise transport of wire or cable. More particularly, it concerns unusually advantageous apparatus and method effecting such severing, stripping, and endwise transport of wire or cable.

There is continual need for equipment capable of severing wire or cable into sections, and also capable of rapidly and efficiently stripping sheathing off ends of those sections. It is desirable that these functions be carried out as a wire or cable travels along generally the same axis, i.e., progresses forwardly, and that multiple wire and cable sections of selected length be produced, each having its opposite ends stripped of sheathing, to expose bare metal core wire at each end.

More generally, there is need for very simple, effective, and reliable apparatus to controllably sever wire or cable, strip insulation therefrom, and controllably drive wire or cable to and from work stations at which wire or wire end portions are processed, and with minimum power requirements. Provision for means to enable different size wires to have the same endwise travel center line is also needed. The word "wire" herein will be used to designate wire or cable.

There is need to provide separate wire cutting and insulation stripping blades where the blades are located adjacent one another for simplicity of design and ease of cut insulation slug removal, and/or where there is ability to easily change between "V"-type and "die"-type blades, and/or where blade configuration may change, as for cutting heavy-duty cable, or for cutting extremely small diameter cable, or for cutting cable of sizes between heavy duty and extremely small diameter.

SUMMARY OF THE INVENTION

It is a major object of the invention to provide improved apparatus meeting the above need. Basically, the apparatus processes wire moved along a travel path, and includes:

a) a primary wire processing blade pair including first and second blades at opposite sides of the wire travel path, b) a secondary wire processing blade pair including third and fourth blades at opposite sides of the wire travel path, c) drive means, d) and means operatively connected between the drive means and the blade pairs, and operatively intercoupling the first and third blades, and also operatively intercoupling the second and fourth blades, and responsive to operation of the drive means to cause the first blade to be displaced toward the path as the third blade is displaced away from the path, and to cause the second blade to be displaced toward the path as the fourth blade is displaced away from that path.

As will appear, the first and second blades are typically respectively located in opposed relation at opposite sides of the wire travel path, and the third and fourth blades are respectively located in opposed relation at opposite sides of the wire travel path.

In this regard, use of separate wire or cable cutting and stripping blades has the following advantages: dulling of the strip blade, which cuts into the metal conductor, is reduced; various types of strip blades (die-type blades and V-type blades) may be employed; need for a single blade for both wire or cable cutting, as well as for insulation or sheath stripping, which rapidly dulls the blade, is eliminated. Further, locating the cutting blade adjacent to the stripping blade avoids problems having to do with feeding the wire between the cutting blade and the strip blade.

Another object includes the provision of first and second carriers respectively carrying the first and second blades, and third and fourth carriers respectively carrying the third and fourth blades, the first and third carriers operatively intercoupled to move together, and the second and fourth carriers operatively intercoupled to move together. In this regard, the first and third carriers are typically linked together to move as a unit, and the second and fourth carriers are also linked together to move as a unit, the two units movable in adjacent parallel relation, but relative to one another. Linking structures are provided for these purposes, as will appear.

A further object includes the provision of a drive operatively connected to the first and second carriers, the third carrier driven with the first carrier, and the fourth carrier driven with the second carrier. In this regard, the drive advantageously includes a rotary actuator operatively connected to the first and second carriers to displace the first and second carriers relatively toward one another as the actuator rotates in one direction, and to displace the first and second carriers relatively away from one another as the actuator rotates in the opposite direction; and the actuator may have turnbuckle drive transmission elements. Frame and guide structures are typically used for supporting and guiding the carrier, for movement relatively toward and away from the travel path.

Yet another object includes the provision of wire conveying apparatus to convey the wire in the travel direction for processing by the cutter pairs, and including a) conveyor means for displacing the wire endwise, the conveyor means including first upper and lower endless conveyors engageable with opposite sides of the wire, b) and first upper and lower assemblies for carrying and controllably driving the conveyors, c) there being frame means including guide means on which the assemblies are supported and guided for relative movement toward and away from one another, d) there being timing belts operatively connected with the assemblies to transmit rotary drive to the conveyors via the assemblies, in different positions of the assemblies associated with the relative movement thereof.

As will be seen, the two assemblies typically include driven timing pulleys on which the timing belts are entrained. Of advantage is the fact that only a single conveyor drive motor is required for each conveyor pair, there being driving timing pulleys rotatably carried by the frame and operatively connected with the drive motor to be driven thereby, and the timing belts respectively entrained on the driving timing pulleys. Shaft means and gearing may be operatively coupled between the drive motor and the driving timing pulleys, whereby one driving pulley is rotated clockwise, and the other driving pulley is rotated counterclockwise. Also the conveyors typically include endless belts having stretches extending in the direction of the wire at opposite sides thereof.

It is another object of the invention to locate the guide means to extend vertically so that the assemblies are vertically movable toward and away from one another, the driven and driving timing pulleys having horizontally parallel extending axes, the axis of each driving timing pulley spaced substantially horizontally from the axis of its associated driven timing pulley, whereby the timing belts accommodate to the relative movement of the assemblies toward and away from one another.

Yet another object is to provide secondary drive means on the frame means and coupled with the assemblies for effecting the relative movement thereof. In this regard, the secondary drive means is coupled with the assemblies via the guide means; the guide means may comprise an elongated element on which the assemblies are slidably mounted; and the elongated element may comprise a shaft rotatably mounted on the frame to be rotated by the secondary drive means, and structure carried on the shaft for controllably yieldably urging the assemblies toward one another.

A further object is the provision of nut structure in threadable engagement with the shaft, and spring means between the nut means and the assemblies to exert yieldable force against the assemblies, in directions toward the wire.

An additional object is to provide the conveyor means to include second upper and lower endless conveyors engageable with opposite sides of the wire, and spaced from the first upper and lower conveyors in the direction of wire travel, and wire cutter means located between the first conveyor and the second conveyor.

Also then includible are:

i) second upper and lower assemblies for carrying and controllably driving the second conveyors, ii) there being second frame means including second guide means on which the second assemblies are supported and guided for relative movement toward and away from one another, iii) there being second timing belts operatively connected with the second assemblies to transmit rotary drive to the second conveyors via the second assemblies, in different positions of those assemblies associated with the relative movement thereof.

These and other objects and advantages of the invention, as well as the details of an illustrative embodiment, will be more fully understood from the following specification and drawings, in which:

DRAWING DESCRIPTION

FIG. 6 is a plan view taken in section on lines 6—6 of FIG. 5;

FIG. 7 is a section taken in elevation on lines 7—7 of FIG. 1;

FIG. 8 is a fragmentary elevation taken on lines 8—8 of FIG. 4;

FIG. 10 is a side elevation showing blade actuating apparatus;

FIG. 13 is a top plan view of the FIG. 10 apparatus;

DETAILED DESCRIPTION

Figure 1:
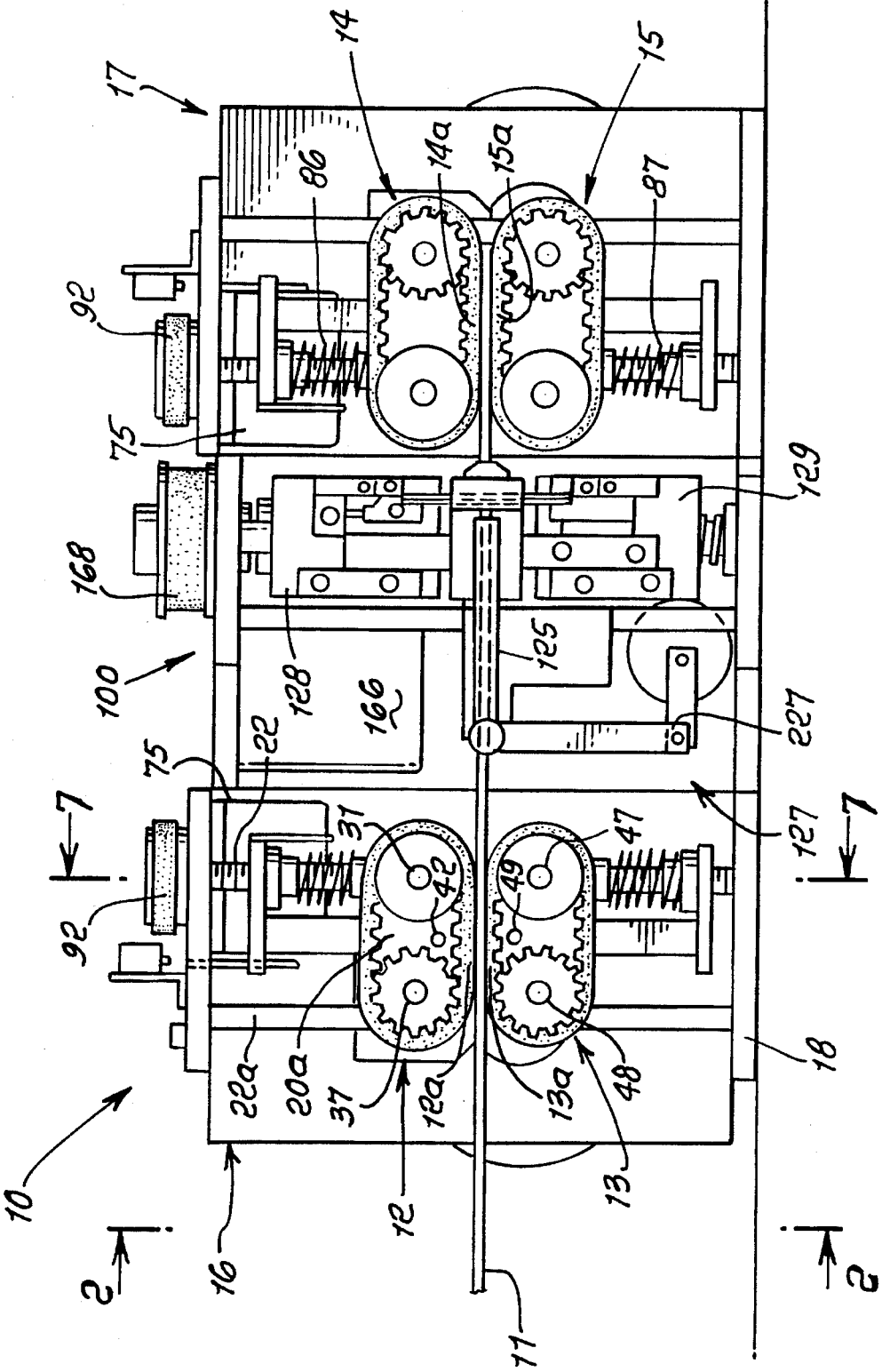
FIG. 1 is a side view elevation showing wire displacing and processing apparatus.

The illustrated wire conveying apparatus 10 in FIG. 1 is used for processing wire or cable 11 moving from left to right under the control of conveyor means. As shown, the conveyor means includes first upper and lower endless conveyors 12 and 13 engageable with opposite sides (upper and lower) of the wire. The conveyor means may also include second upper and lower endless conveyors 14 and 15 engageable with upper and lower sides of the wire, as the wire, or a cut section thereof, travels rightwardly. The conveyors 12 and 13 operate together so that their belt stretches 12a and 13a engage and displace the wire rightwardly, or leftwardly; and likewise, conveyors 14 and 15 operate together so that their stretches 14a and 15a engage and displace wire or a cut section thereof rightwardly or leftwardly. Frames associated with the conveyors are indicated generally at 16 and 17, and a base for the frames at 18.

Figure 2:
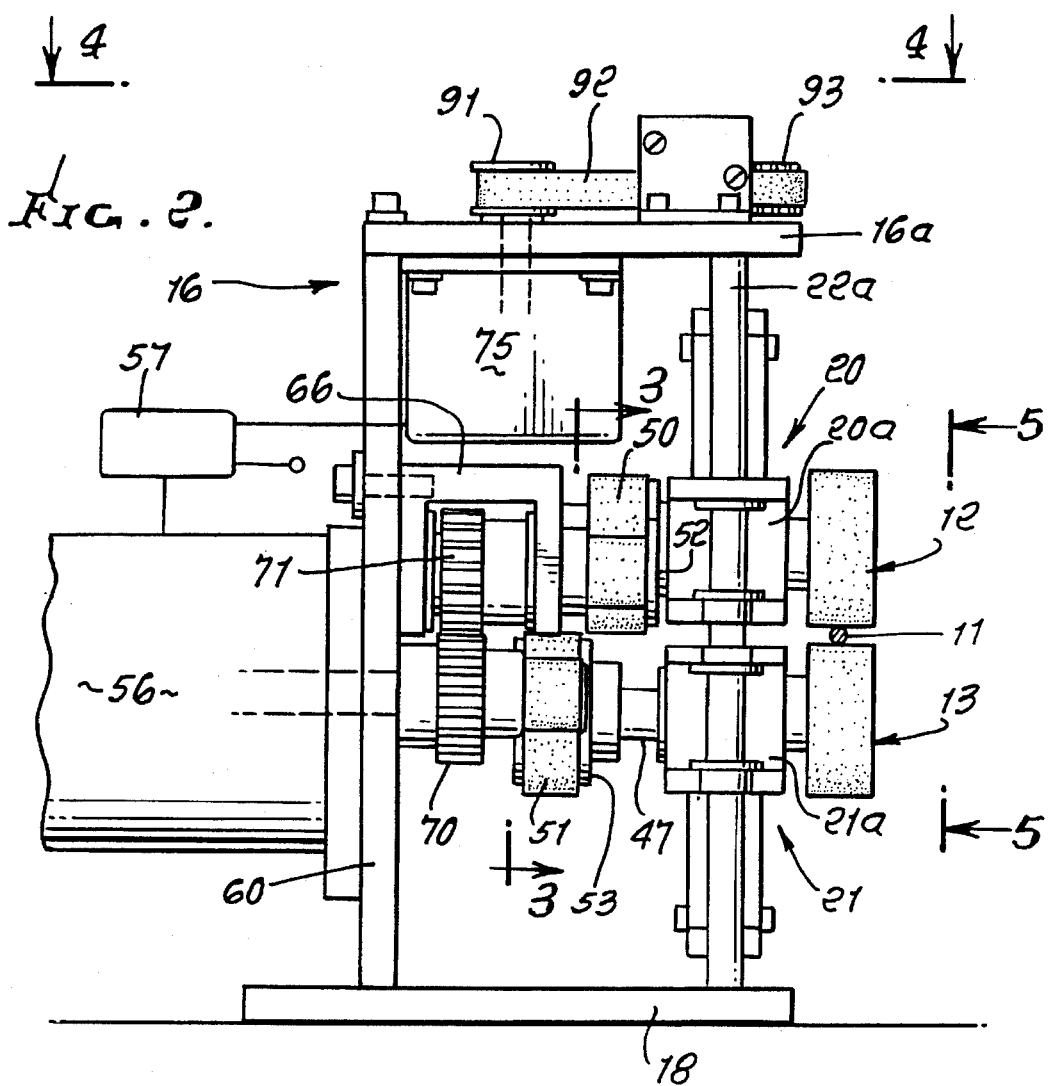
FIG. 2 is an enlarged elevation taken on lines 2—2 of FIG. 1.
Figure 4:
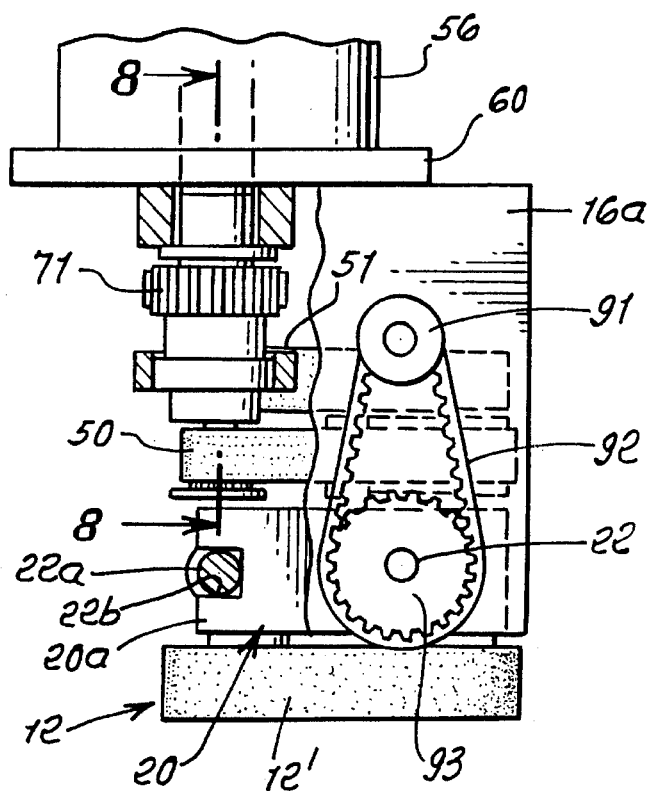
FIG. 4 is a plan view, partly broken away, taken on lines 4—4 of FIG. 2.

Referring now to FIG. 2, first upper and lower assemblies 20 and 21 are provided to respectively carry and controllably drive the first conveyors 12 and 13. The frame 16 includes an upper plate 16a; and a guide means for the assemblies 20 and 21 is provided in the form of a fixed shaft 22a and a rotary vertical shaft 22, both extending between 16a and the base 18. Shafts 22a and 22 are spaced apart as shown. See also FIGS. 4 and 7. Shaft 22a guides in slot 22b in a block 20a. The assemblies 20 and 21 include blocks 20a and 21a containing bores 25 and 26 to pass the shaft, sleeve bearings 27 and 28 being provided to enable guided up and down sliding of the blocks on the shaft.

Conveyor 12 includes a driven sprocket 30 keyed to a drive shaft 31 extending horizontally normal to the direction of wire travel (see FIG. 6). Shaft 31 is mounted by bearings 32 and 33 mounted on block 20a. Conveyor 12 idler sprocket 34 rotates on bearings 35 and 36 supported by a shaft 37 in the form of a screw attached to sub-block 38. The latter is attached by fasteners 39 and 40 to block 20a. An additional toothed idler 41 is carried by a shaft 42 mounted in a bore 43 in block 20a. Block 38 is easily removed to permit change of belt 12'.

Figure 5:
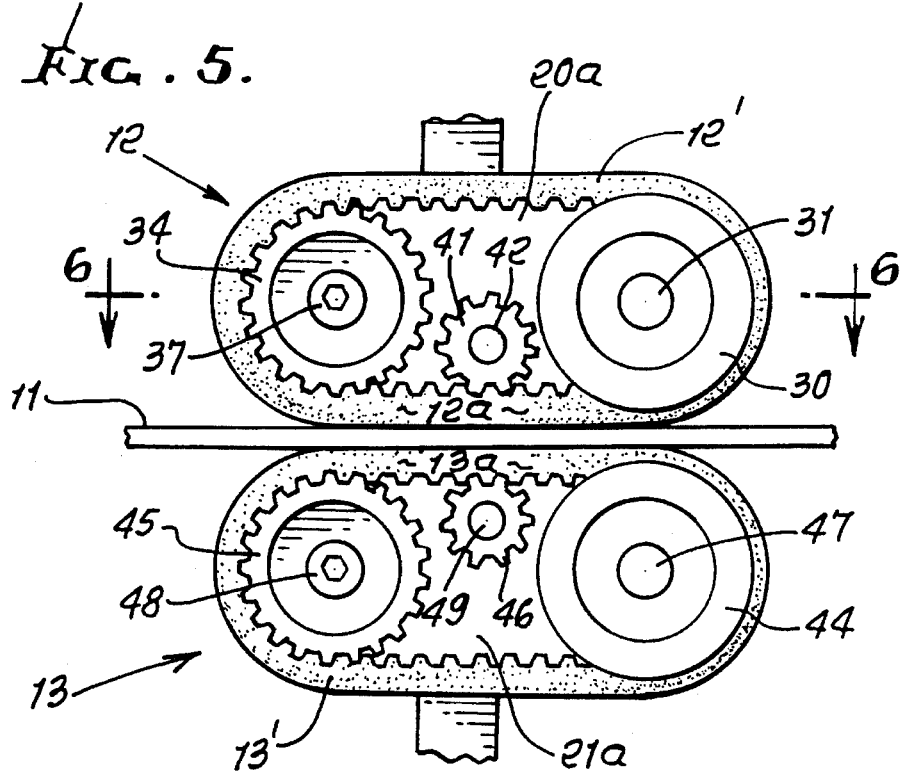
FIG. 5 is an elevation taken on lines 5—5 of FIG. 2.
Figure 9A:
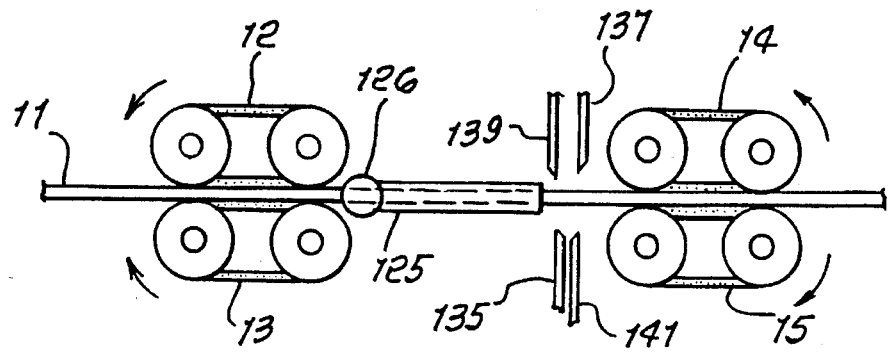
FIG. 9 is a diagrammatic view of blade movement in relation to conveyor operation.
Figure 9B:
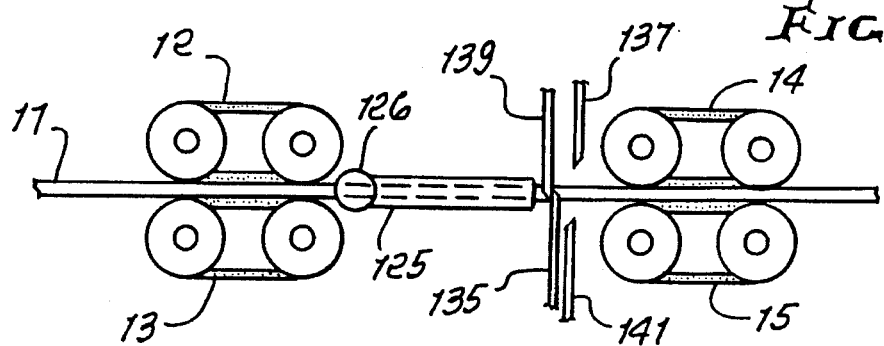
Figure 9C:
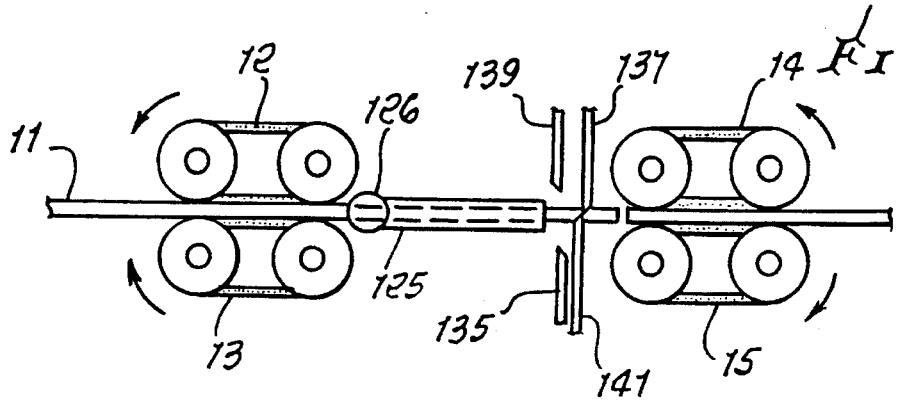
Figure 9D:
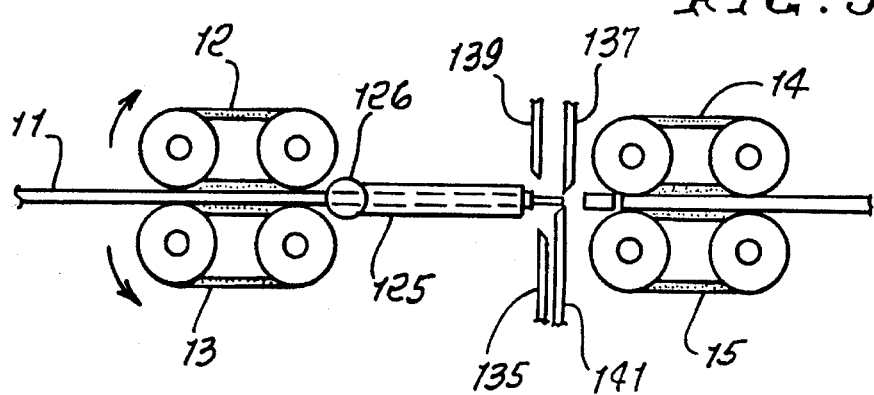
Figure 9E:
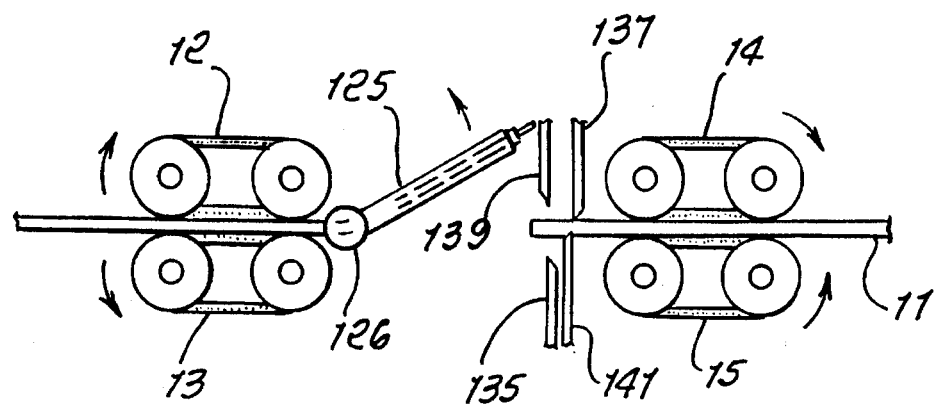
Figure 9F:
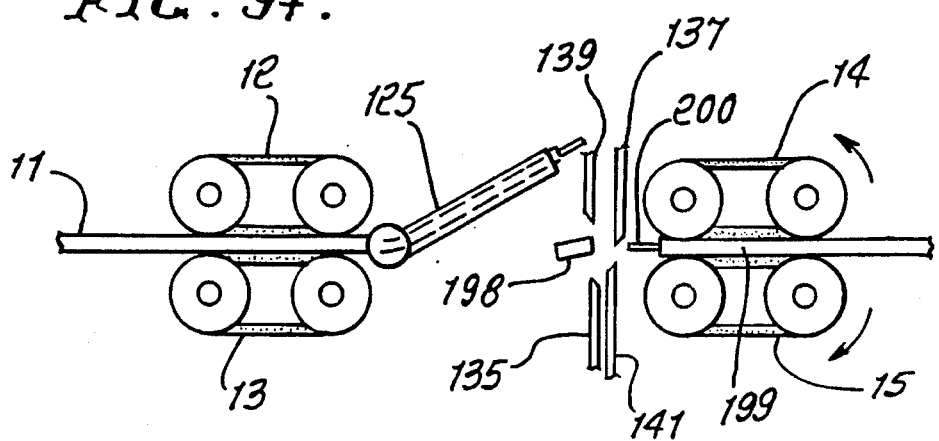
Figure 9G:
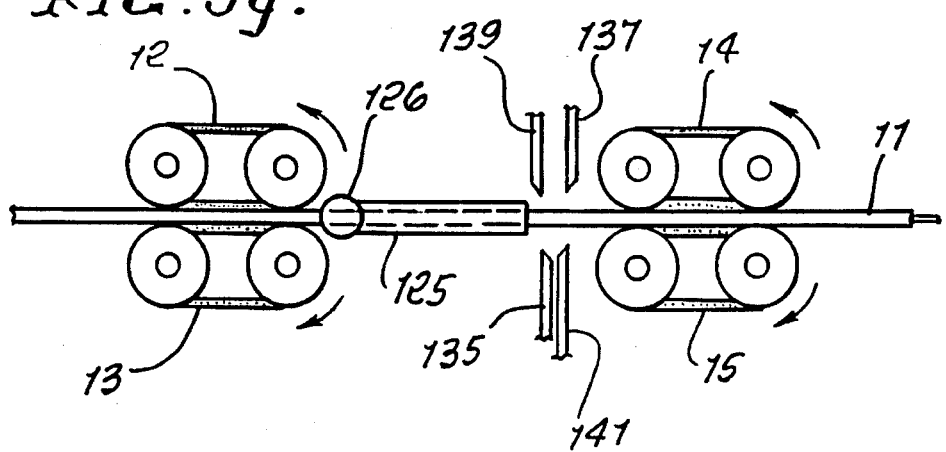

Conveyor belt 12' is a timing belt entrained on 30, 34 and 41, as shown in FIG. 5. The lower conveyor 13 includes like or corresponding elements, indicated in FIG. 5 by toothed drive sprocket 44, idler sprocket 45, and idler sprocket 46. Lower belt 13' is entrained on 44, 45 and 46, as shown. A drive shaft to sprocket 44 is indicated at 47 in FIGS. 1 and 5; and shafts mounting 45 and 46 are indicated at 48 and 49.

See also block 21a in FIG. 5. Thus, the upper and lower assemblies have generally the same construction. Sprockets 41 and 46 are omitted in FIG. 1, but their shafts 37 and 49 are indicated.

In accordance with an important feature of the invention, timing belts are operatively connected with the assemblies to transmit rotary drive to the conveyors via the assemblies, in different positions of the assemblies associated with relative up and down movement thereof.

Figure 3:
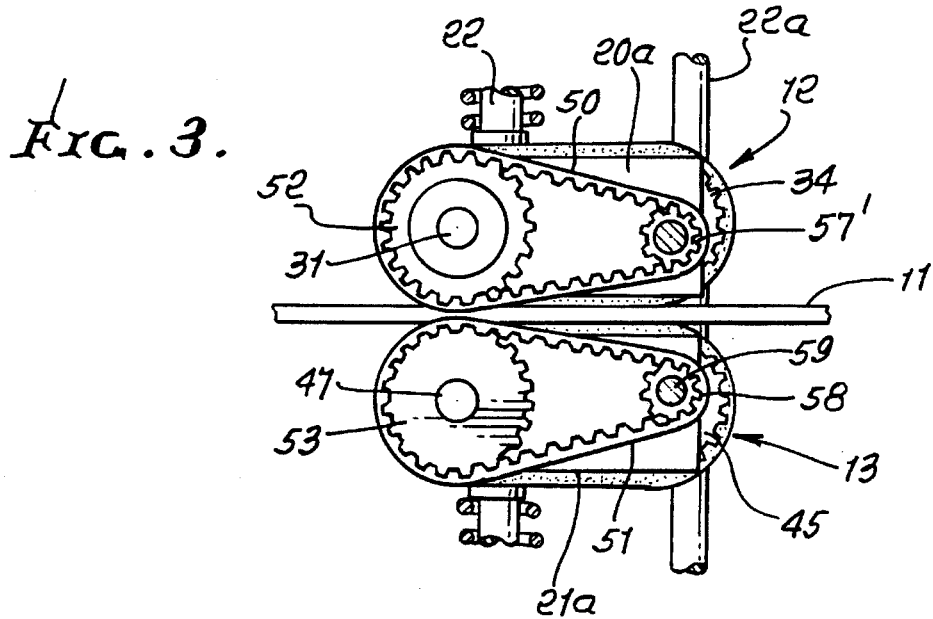
FIG. 3 is a section taken on lines 3—3 of Fig. 2.

Referring to FIG. 3, upper and lower timing belts are shown at 50 and 51, belt 50 entraining an upper assembly driven timing pulley or sprocket 52 on shaft 31; and belt 51 entraining a lower assembly driven timing pulley or sprocket 53 on shaft 47. See also the offset relation (in directions parallel to the shafts) of these belts 50 and 51 in FIG. 2, whereby a highly compact construction is achieved.

A single drive motor 56, electrically controlled by master controller 57, drives both drive belts 50 and 51. See in this regard drive sprockets 57 and 58 for the timing belts 50 and 51. Sprocket 58 is on a shaft 59 extending from the motor 56 (see FIG. 8) mounted to frame plate 60. Thus, drive sprocket 58 does not move up or down with associated lower conveyor 13. Sprocket 57 is on auxiliary shaft 63 parallel to shaft 59 but carried by bearings 64 and 65. The latter are in turn carried by frame structure 66 attached to plate 60. Thus, drive sprocket 57 does not move up and down with associated upper conveyor 12.

In this regard, it will be noted that the guide shaft 22 extends vertically so that the assemblies are vertically movable toward and away from one another, the driven and driving timing pulleys having horizontally parallel extending axes, the axis of each driving timing pulley spaced substantially horizontally from the axis of its associated driven timing pulley, whereby the timing belts accommodate to the relative movement of the assemblies toward and away from one another. A highly compact and integrated combination of elements is thereby achieved. Shaft 63 rotates counter to shaft 59, due to meshing gears 70 on shaft 59, and 71 on shaft 63, whereby the conveyor belts 12' and 13' are driven oppositely (in clockwise and counterclockwise relation respectively) and stretches 12a and 13a in the same direction, simultaneously.

Also provided is secondary drive means on the frame and coupled with the assemblies for effecting the vertical relative movement thereof. In the embodiment shown, the secondary drive means, as for example motor 75, located below plate 16a, is coupled with the assemblies 12 and 13 via the guide means in the form of the elongated and rotatable shaft element 22 on which the assemblies are slidably mounted, as referred to above. The shaft 22 is rotatably mounted to the frame, as via upper and lower bearings 76 and 77, as seen in FIG. 7. Motor coupling to shaft 22 includes driving pulley 91, timing belt 92, and driven pulley 93 mounted on 22 for driving the latter. Structure is carried by the shaft for controllably and yieldably urging the assemblies toward one another. As shown, that structure may advantageously take the form of nut means, as for example nuts 80 and 81, in threadable engagement with the shaft, as at thread locations 82 and 83 on the shaft. The threads are such that when the shaft is rotated in one direction, nut 80 moves downwardly and nut 81 moves upwardly, relative to the shaft. When the shaft is rotated in the opposite direction, the nuts move up to engage plates 84 and 85 to lift the upper conveyor and lower the lower conveyor, opening up the gap between the conveyors.

Spring means, as for example compression springs 86 and 87, between the nuts and the blocks 20a and 21a, exert yieldable and controllable force against the assemblies 12 and 13 in directions yieldably urging them toward one another, and which in turn exert that force on the wire, via the conveyor belts 12' and 13'. The extent of rotation of the shaft 22, as controlled by stepping motor 75, determines the gripping force exerted on the wire, and that force may be varied in accordance with the wire size and surface texture. The master controller 57 controls motor 75. Thus, any size wire or cable can be accurately engaged or driven forwardly or reversely, for processing at the work station, indicated at 100.

The structure driving and controlling the forward or second conveyors 14 and 15 is the same as that described for conveyors 12 and 13, the work station 100 located between those pairs of conveyors 12 and 13, and 14 and 15. Cutter blades and their operation may take the form, as described in U.S. Pat. No. 5,199,328, incorporated herein by reference. See blades indicated at 13a' and 13b', 16a' and 16b' and 17a' and 17b', in FIG. 1, and corresponding to blades 13a, 13b, 16a, 16b, 17a, and 17b, described in that prior patent. Other forms of blades and blade operating mechanism 105 may also be used.

Accordingly, the wire drive is usable in conjunction with cutter blades located for movement toward and away from the endwise axis, and with blade drive means operatively connected with the blades to displace them toward and away from the endwise axis, to sever the cable or the wire, and also to strip insulation therefrom. Drive mechanism for the blade operating mechanism 105 may be controlled by controller 57.

As seen from the above, apparatus embodying the invention embodies:

a) conveyor means for displacing the wire endwise, the conveyor means including first upper and lower endless conveyors engageable with opposite sides of the wire, b) and first upper and lower assemblies for carrying and controllably driving the conveyors, c) there being frame means including guide means on which the assemblies are supported and guided for relative movement toward and away from one another, d) there being timing belts operatively connected with the assemblies to transmit rotary drive to the conveyors via the assemblies, in different positions of the assemblies associated with the relative movement thereof.

The method of operating the conveying apparatus includes the steps:

i) adjusting the relative positions of the first and second assemblies to open up a wire-receiving space between the upper and lower conveyors, ii) then closing the conveyors toward one another and feeding a wire between the conveyors so that the conveyors engage opposite sides of the wire, iii) then advancing the conveyors by operation of the timing belts, iv) then processing the wire being advanced by the conveyors after the wire advances beyond the conveyors.

Referring again to FIG. 7, means is provided to include springs positioned to exert yieldable force on the assemblies, the nut elements 80 and 81 having threaded engagement with the second guide 22 to controllably tension the respective springs, in response to controlled rotation of the second guide. Such means may include shoulders such as flats 130 on each nut and spaced about the shaft axis. Holders 131 engage the flats and are carried by the frame, to hold the nuts against rotation. Each holder may be moved (deflected) away from a flat, to allow selective or adjustable rotation of the nut, whereby the spring tension associated with that nut can be adjusted. Thus, by increasing the tension in the upper spring, the two conveyors can be lowered, and vice versa; and by increasing the tension in the lower spring, the two conveyors can be raised. Thus, the wire center position between the conveyors can be raised or lowered, to accommodate wire feed locations.

In FIG. 7, the drive 93 may comprise a hand wheel instead of (or in addition to) being motor driven, for enhanced control.

The described timing belt driven apparatus eliminates backlash that would otherwise be associated with gears, whereby very accurate control of wire advancement and retraction is achieved. Thus, the drive motor for the conveyors is reversible and may be a step motor.

Accordingly, the conveying apparatus enables different diameter wires to be handled and to have the same endwise travel center line, as for feeding to wire cutting and stripping blades, and associated apparatus, which is a very desirable feature or result. Very simple, effective, anti-backlash means is provided to achieve these objectives.

Referring now to FIGS. 10–13, the wire processing apparatus 125 receives wire 11 being advanced endwise by conveyors, as for example at 12 and 13, and severs and strips the wire. A wire guide is shown in the form of a tube 125 having a tapered or funnel-shaped entrance 126a defined by a pivot 126, operable to controllably cyclically pivot the received wire out of the endwise travel path through apparatus 125. Support arm 227 for pivot 125 is rotated by a rotor 228 driven by an adjustable speed motor 229, to cyclically pivot the wire. See FIG. 9 operation.

The wire processing apparatus basically comprises:

a) a primary wire processing blade pair including first and second blades at opposite sides of the wire travel path, b) a secondary wire processing blade pair including third and fourth blades at opposite sides of the wire travel path, c) drive means, d) and means operatively connected between the drive means and the blade pairs, and operatively intercoupling the first and third blades, and also operatively intercoupling the second and fourth blades, and responsive to operation of the drive means, to cause the first blade to be displaced toward the wire travel path as the third blade is displaced away from the path, and to cause the second blade to be displaced toward the path as the fourth blade is displaced away from the path.

As shown, a frame 127 includes top and bottom members 127a and 127b, and upright member 127c interconnecting 127a and 127b. Member 127c also serves as a guide for blade carriers. The latter include an upper block 128 and a lower block 129 defining bores 128a and 129a to yieldingly slide on tubular member 127c. The blocks may include sleeve bearings 130–133 as shown. Lower block 129 carries:

a lower blade carrier or holder 134, and a lower cutter blade 135 for cutting or severing the wire, an upper blade carrier or holder 136, and an upper stripper blade 137 for stripping insulation from the wire.

Upper block 128 carries: an upper blade carrier or holder 138, and an upper cutter blade 139 for cutting or severing the wire, and a lower blade carrier or holder 140, and a lower stripper blade 141 for stripping insulation from the wire.

Figure 11:
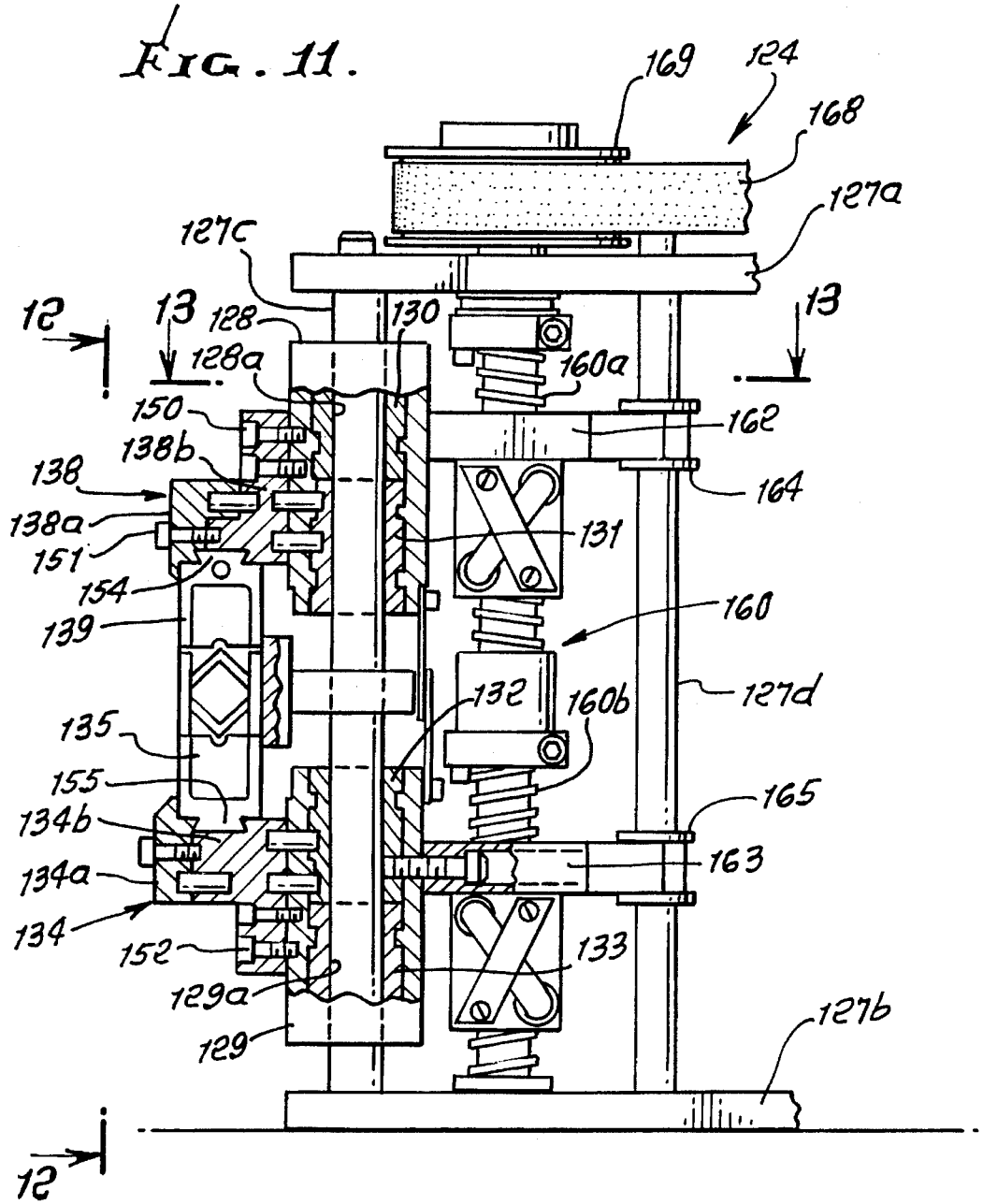
FIG. 11 is an enlarged elevation of the FIG. 10 apparatus taken in partial section and from the opposite side of the apparatus.
Figure 11A:
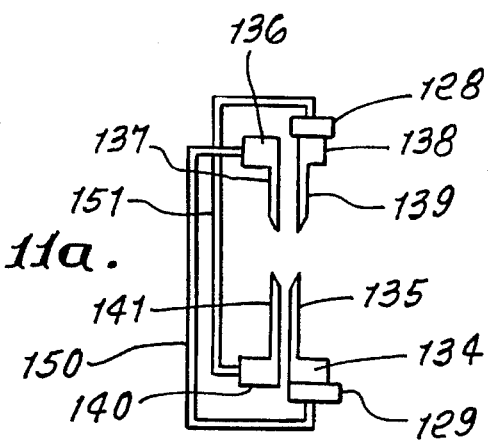
FIG 11a shows the wire cutting blades and the wire stripper blades.

Reference is also made to the diagram of FIG. 11a in this regard. Link 150 connects blade carriers 134 and 136; and link 151 connects blade carriers 140 and 138. From FIG. 11a, it is clear that as wire cutter blades 135 and 139 are moved oppositely toward one another to cut a wire, by movement of blocks 128 and 129 toward one another, the stripper blades 137 and 141 are moved oppositely away from the wire, by virtue of the motion transfer links 150 and 151; and as the blocks 128 and 129 are subsequently moved away from one another, cutter blades 139 and 135 are moved oppositely away from the wire; and stripper blades 137 and 141 are moved toward one another, i.e., toward the wire, to cut into wire insulation, for stripping same from the wire as the cut wire is the moved axially endwise. This also occurs by virtue of the operation of the motion transfer links. Thus, during one cycle, both cutting and stripping actions occur.

The blades and carriers may also be designated as follows:

| Carrier | Blade |
|---|---|
| first carrier 138 | first blade 139 |
| second carrier 134 | second blade 135 |
| third carrier 140 | third blade 141 |
| fourth carrier 136 | fourth blade 137 |

The above elements are also shown in FIGS. 10–13. The first carrier 138 may be easily detached from the block 128, as for repair, by removal of fasteners 150; and the plate 138a of the carrier 138 may be removed from the block part 138b, by removal of fasteners 151, for easy replacement of blade 139. Similarly, the second carrier 134 may be quickly detached from the block 129, as for repair, by removal of fasteners 152; a plate 134a may be removed by removal of fasteners to block part 134b, for easy and quick replacement of blade 135. Note dovetail locating connections of the blades to the blocks, at 154 and 155.

Figure 12:
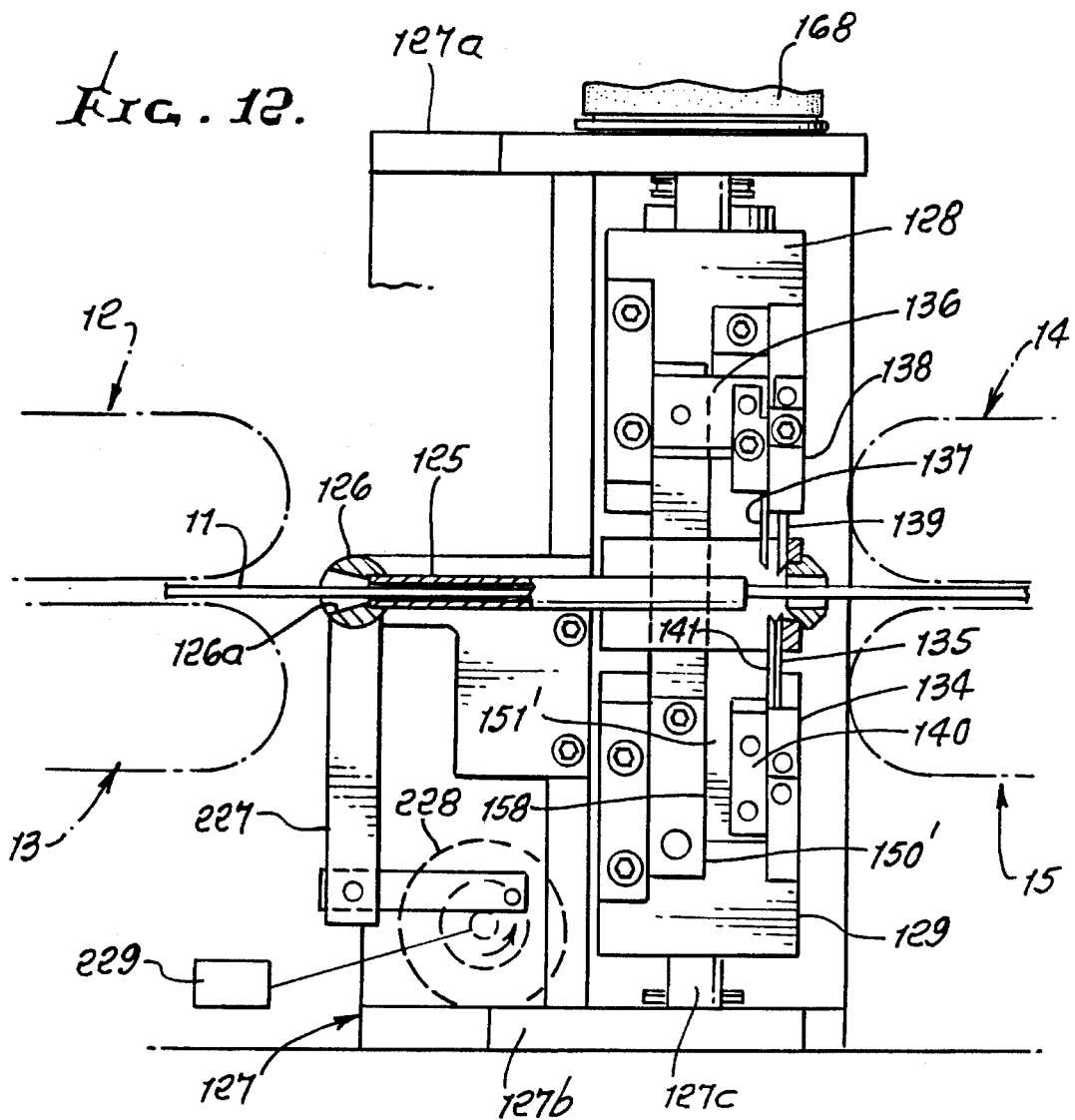
FIG. 12 is a frontal elevation taken on lines 12—12 of FIG. 11.

Note that the links 150 and 151 extend in closely adjacent, parallel relation in FIG. 12, and may slidably engage one another at 158 for guiding and locating purposes.

By virtue of the above construction, only one actuator and one motor are provided to effect blade displacement, as referred to (first cutter blade displacement toward the wire to cut same, and then stripper blade displacement toward the wire to cut into insulation for stripping same), as the blocks 128 and 129 are cycled once, i.e., first toward one another (an extension stroke) and then away from one another (a return stroke). Thus, great simplification in construction and operation can be achieved. In this regard, the drive is operatively connected to the first and second carriers, the third carrier driven with the first carrier, and the fourth carrier driven with the second carrier. Also in this regard, the drive illustrated includes a rotary actuator shaft 160 extending in parallel relation to guide shaft 127c (see FIG. 11).

An additional frame part 127d is connected to 127a and 127b, and extends parallel to 160 and 127c. Horizontal arms 162 and 163 extend from blocks 128 and 129 to bearings 164 and 165 on part 127d, which acts as a linear guide for bearing up and down movement as the blocks 128 and 129 move up and down.

The rotary actuator shaft 160 is rotated about its axis by a drive motor 166, and drive elements, including drive pulley 167, belt 168, and driven pulley 169 connected to shaft 160. The shaft 160 is operatively connected to the first and second carriers 138 and 134, as via arm 162 and 163, to displace the first and second carriers relatively toward one another as the actuator rotates in one direction, and to displace the first and second carriers relatively away from one another as the actuator rotates in the opposite direction. Note that the shaft 160 has turnbuckle worm threads 160a and 160b thereon (i.e., oppositely threaded) to engage corresponding worm threads (see for example thread 170 in arm 162 in FIG. 13) in arms 162 and 163, for driving the arms oppositely, along with the blocks 128 and 129 to which the arms are respectively connected. Accordingly, a very simple and effective turnbuckle-type drive is employed to control timed movement of four blades, to cut and strip a wire.

Figure 14:
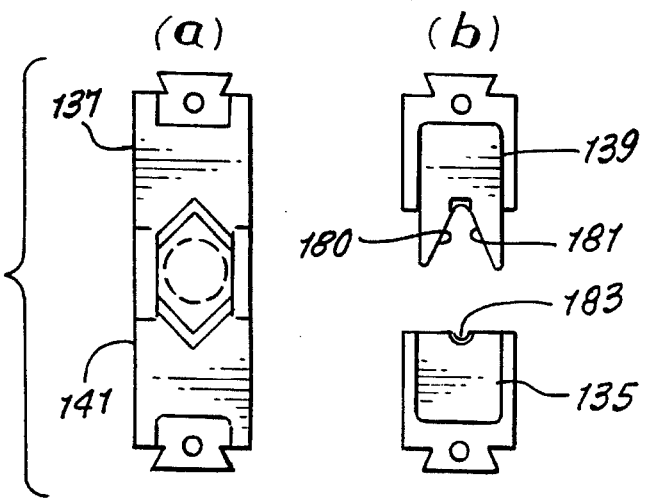
FIG. 14 is a frontal elevation showing a blade pair.

FIG. 14b shows details of cutter blade configuration. Note V-shaped blade edges at 180 and 181 on blade 139, and U-shaped edge 183 on blade 135.

FIG. 12 also shows a tubular guide 126 for the wire, a pivot 126 mounting the tubular guide to controllably pivot the guide and wire out of, and back into, alignment with the wire endwise travel path extending between the first and second conveyor pairs. Note that the blades are oriented to close toward and open away from that path.

A control for the motor 166 (for example a step motor), and for the drive 190 for the pivot 187, is shown at 57a, and may be integrated with control 57 previously described.

FIG. 9 shows typical steps (a) through (g) in the wire cutting and stripping sequence. Stripped off insulation slugs appear at 198, and wire sections at 199, with exposed wire ends at 200.

Figure 15:
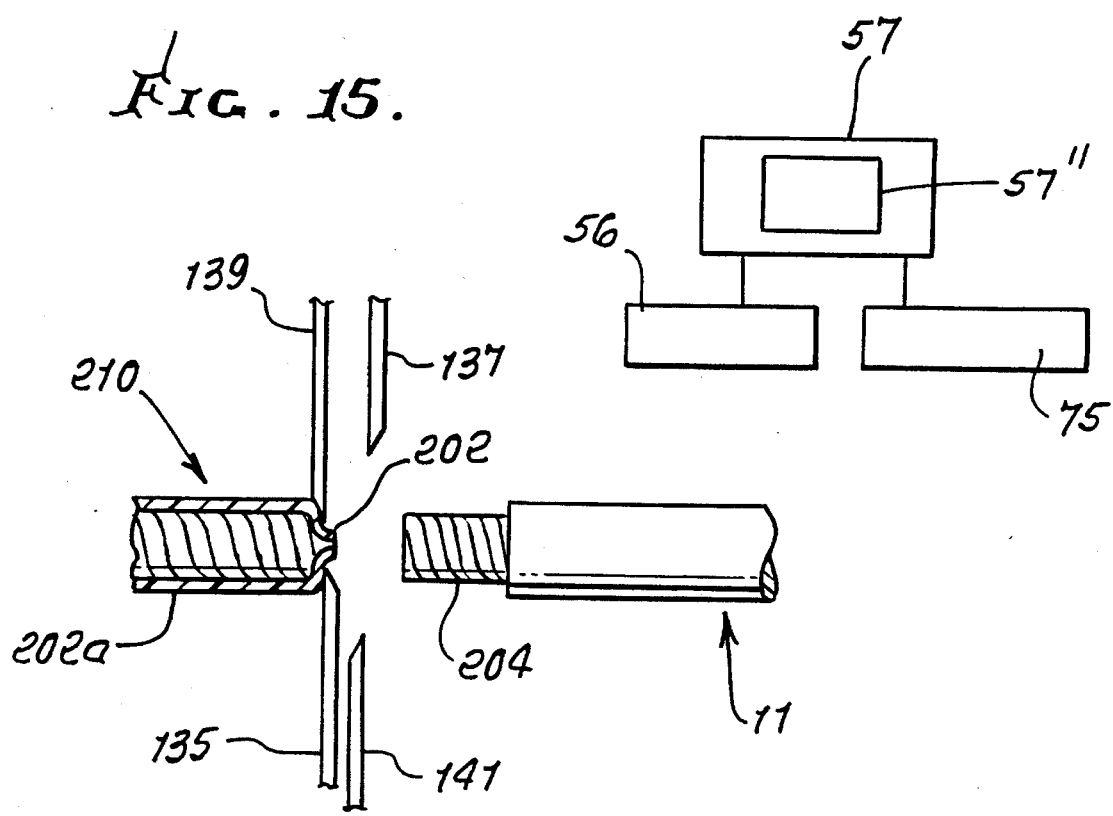
FIG. 15 shows a sheathing slug being stripped off a wire.

FIG. 15 shows a sheathing slug 200 being stripped off a wire by stripping blades 137 and 141, as the wire 11 is conveyed relatively to the right. A sheathing "tail" 202 may be formed by the sheathing at one end of the slug.

Figure 16:
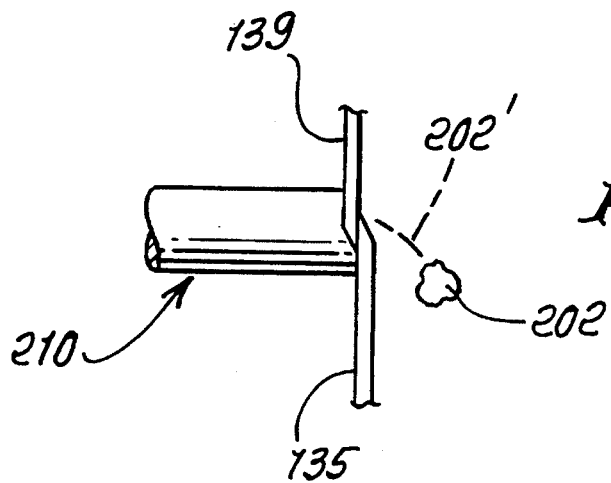
FIG. 16 shows operation of stripping blades to sever a tail formed by the sheathing slug.

FIG. 16 shows the stripping blades moved relatively toward one another to close adjacent one another and sever the tail 202 during the stripping operation. The tail 202 is shown falling away; and broken lines 202' show the remaining slug then falling away from the closed-together blades. The blades are then opened for use during a subsequent stripping operation. The stripper blade drive 75 causes closing of the stripper blades, as described, and the control means 57 for the drive 75 contains programming means 57' to effect such blade closing, as well as cutting and stripping blade operation, as described in detail above.

The tail 202 is typically formed as a result of rotation of the sheathing 202a on the spiral wire core 204, such rotation induced as the sheath 202a moves axially over the spiral core. The sheath inner surface is shown as indentation spiral grooved in FIG. 15.

I claim:

1. In wire processing apparatus wherein wire is moved endwise along a travel path, the combination comprising:

a) a primary wire processing blade pair including first and second blades at opposite sides of the wire travel path,
 b) a secondary wire processing blade pair including third and fourth blades at opposite sides of the wire travel path,
 c) drive means,
 d) and means operatively connected between said drive means and said blade pairs, and operatively intercoupling the first and third blades, and also operatively intercoupling the second and fourth blades, and responsive to operation of the drive means to cause the first blade to be displaced toward said path as the third blade is displaced away from said path, and to cause the second blade to be displaced toward said path as the fourth blade is displaced away from said path,
 e) and belts extending along said travel path for engaging and advancing the wire therealong.

2. The combination of claim 1 wherein said first and second blades are respectively located in opposed relation at opposite sides of said wire travel path, and said third and fourth blades are respectively located in opposed relation at opposite sides of said wire travel path.

3. The combination of claim 1 wherein said means includes first and second carriers respectively carrying the first and second blades, and third and fourth carriers respectively carrying the third and fourth blades, the first and third carriers operatively intercoupled to move together, and the second and fourth carriers operatively intercoupled to move together.

4. The combination of claim 3 wherein said first and third carriers are linked together to move as a unit, and the second and fourth carriers are linked together to move as a unit.

5. The combination of claim 3 including linking structure interconnecting the first and third carriers, and interconnecting the second and fourth carriers.

6. The combination of claim 3 wherein the drive is operatively connected to the first and second carriers, the third carrier driven with the first carrier, and the fourth carrier driven with the second carrier.

7. The combination of claim 6 wherein the drive includes a rotary actuator operatively connected to the first and second carriers to displace said first and second carriers relatively toward one another as the actuator rotates in one direction, and to displace said first and second carriers relatively away from one another as the actuator rotates in the opposite direction.

8. The combination of claim 7 wherein the actuator has turnbuckle drive transmission elements, and including a motor connected to rotate said actuator turnbuckle elements.

9. The combination of claim 6 including frame and guide structure supporting and guiding said carrier, for movement relatively toward and away from said travel path.

10. The combination of claim 7 wherein the first and third carriers are linked together to move as a unit, and the second and fourth carriers are linked together to move as a unit.

11. The combination of claim 7 including linking structure interconnecting the first and third carriers, and interconnecting the second and fourth carriers.

12. The combination of claim 11 wherein said linking structure includes a primary link operatively linking together the first and third carriers, and a secondary link operatively linking together the second and fourth carriers, the primary and secondary links extending in parallel relation.

13. The combination of claim 12 wherein the primary and secondary links extend in adjacent relation.

14. The combination of claim 1 including a tubular guide for the wire, and a pivot mounting the guide to controllably pivot the wire out of and back into alignment with said travel path.

15. The combination of claim 1 including pairs of endless conveyors spaced along said travel path for engaging and advancing the wire therealong, each pair of conveyors including first upper and lower endless conveyors engageable with opposite sides of the wire.

16. The combination of claim 15 including:

i) first upper and lower assemblies for carrying and controllably driving said conveyors,
 ii) there being frame means including guide means on which said assemblies are supported and guided for relative movement toward and away from one another,
 iii) there being timing belts operatively connected with said assemblies to transmit rotary drive to said conveyors via said assemblies, in different positions of the assemblies associated with said relative movement 17. The combination of claim 16 wherein said assemblies include driven timing pulleys on which said timing belts are entrained.

18. The combination of claim 17 including a first drive motor, driving timing pulleys rotatably carried by the frame and operatively connected with the drive motor to be driven thereby, and said timing belts respectively entrained on said driving timing pulleys.

19. The combination of claim 18 wherein said guide means extends vertically so that said assemblies are vertically movable toward and away from one another, said driven and driving timing pulleys having horizontally parallel extending axes, the axis of each driving timing pulley spaced substantially horizontally from the axis of its associated driven timing pulley, whereby said timing belts accommodate to said relative movement of the assemblies toward and away from one another.

20. The combination of claim 18 including shaft means and gearing operatively coupled between said drive motor and said driving timing pulleys, whereby one driving pulley is rotated clockwise, and the other driving pulley is rotated counterclockwise.

21. The combination of claim 16 including secondary drive means on the frame means and coupled with said assemblies for effecting said relative movement thereof.

22. The combination of claim 21 wherein said secondary drive means is coupled with said assemblies via said guide means.

23. The combination of claim 22 wherein said guide means comprises an elongated element on which said assemblies are slidably mounted.

24. The combination of claim 23 wherein said element comprises a shaft rotatably mounted on the frame to be rotated by said secondary drive means, and structure carried on the shaft for controllably yieldably urging said assemblies toward one another.

25. The combination of claim 24 wherein said structure comprises nut means in threadable engagement with the shaft, and spring means between the nut means and said assemblies to exert yieldable force against said assemblies, in directions toward the wire.

26. The combination of claim 15 wherein said first and second blades are wire cutting blades, and said third and fourth blades are wire sheath stripping blades.

27. The combination of claim 26 including drive means for said conveyors, and control means operatively connected with said blade and conveyor drive means to effect said operation of the drive means to displace the blades as aforesaid and in timed relation to operation of the conveyors.

28. The combination of claim 27 wherein said conveyors are driven to cause the stripping blades to strip a sheath slug off the wire, said control means including programming means for causing the stripping blades to sever a sheathing slug tail produced in response to said stripping.

29. The method of operating apparatus as defined in claim 28, including
   a) causing said blades to cut the wire and to strip a sheathing slug therefrom, whereby the sheathing slug produces a tail,
   b) causing the stripping blades to cut off said slug tail,
   c) and allowing the slug to fall away from the stripping blades.

30. In wire processing apparatus wherein wire is moved endwise along a travel path, the combination comprising:
   a) blade pair means including blades at opposite sides of the wire travel path,
   b) drive means,
   c) and other means operatively connected between said drive means and said blade pair means, and operatively intercoupling the blades, and responsive to operation of the drive means to cause at least a first blade at one side of said path to be displaced toward said path as another blade at the opposite side of said path is displaced away from said path.

31. The combination of claim 30 wherein said blades are respectively located in opposed relation at opposite sides of said wire travel path.

32. The combination of claim 30 wherein said other means includes primary and secondary carriers respectively carrying the blades, the carriers operatively intercoupled to move simultaneously.

33. The combination of claim 32 including linking structure interconnecting the primary and secondary carriers.

34. The combination of claim 32 wherein the drive means includes a rotary actuator operatively connected to the carriers to displace said carriers relatively toward one another as the actuator rotates in one direction, and to displace said carriers relatively away from one another as the actuator rotates in the opposite direction.

35. The combination of claim 34 wherein the actuator has turnbuckle drive transmission elements, and including a motor connected to rotate said actuator turnbuckle elements.

36. The combination of claim 34 including frame and guide structure supporting and guiding said carriers, for movement relatively toward and away from said travel path.

37. The combination of claim 1 including a tubular guide for the wire and located proximate the blades, and a pivot mounting the guide to controllably pivot the wire out of and back into alignment with said travel path.

38. The combination of claim 1 including pairs of endless conveyors incorporating said belts and spaced along said travel path for engaging and advancing the wire therealong, each pair of conveyors including first upper and lower endless conveyors engageable with opposite sides of the wire.

39. The combination of claim 38 including:
   i) first upper and lower assemblies for carrying and controllably driving said conveyors,
   ii) there being frame means including guide means on which said assemblies are supported and guided for relative movement toward and away from one another,
   iii) there being timing belts operatively connected with said assemblies to transmit rotary drive to said conveyors via said assemblies, in different positions of the assemblies associated with said relative movement thereof.

40. The combination of claim 39 wherein said assemblies include driven timing pulleys on which said timing belts are entrained.

41. The combination of claim 40 including a first drive motor, driving timing pulleys rotatably carried by the frame and operatively connected with the drive motor to be driven thereby, and said timing belts respectively entrained on said driving timing pulleys.

42. The combination of claim 41 wherein said guide means extends vertically so that said assemblies are vertically movable toward and away from one another, said driven and driving timing pulleys having horizontally parallel extending axes, the axis of each driving timing pulley spaced substantially horizontally from the axis of its associated driven timing pulley, whereby said timing belts accommodate to said relative movement of the assemblies toward and away from one another.

43. The combination of claim 41 including shaft means and gearing operatively coupled between said drive motor and said driving timing pulleys, whereby one driving pulley is rotated clockwise, and the other driving pulley is rotated counterclockwise.

44. The combination of claim 39 including secondary drive means on the frame means and coupled with said assemblies for effecting said relative movement thereof.

45. The combination of claim 44 wherein said secondary drive means is coupled with said assemblies via said guide means.

46. The combination of claim 45 wherein said guide means comprises an elongated element on which said assemblies are slidably mounted.

47. The combination of claim 46 wherein said element comprises a shaft rotatably mounted on the frame to be rotated by said secondary drive means, and structure carried on the shaft for controllably yieldably urging said assemblies toward one another.

48. The combination of claim 47 wherein said structure comprises nut means in threadable engagement with the shaft, and spring means between the nut means and said assemblies to exert yieldable force against said assemblies, in directions toward the wire.

49. The combination of claim 30 wherein said blade pair means are wire cutting blades and wire sheath stripping blades.

50. The combination of claim 49 including drive means for said conveyors, and control means operatively connected with said blade and conveyor drive means to effect said operation of the drive means to displace the blades as aforesaid and in timed relation to operation of the conveyors.

51. The combination of claim 50 wherein said conveyors are driven to cause the stripping blades to strip a sheath slug off the wire, said control means including programming means for causing the stripping blades to sever a sheathing slug tail produced in response to said stripping.

52. The method of operating apparatus as defined in claim 51, including
   a) causing said blades to cut the wire and to strip a sheathing slug therefrom, whereby the sheathing slug produces a tail,
   b) causing said blades to cut off said slug tail,
   c) and allowing the slug to fall away from the blades.

53. The combination of claim 38 including drive means for said conveyors, and control means operatively connected with said blade and conveyor drive means to effect said operation of the drive means to displace the blades as aforesaid and in timed relation to operation of the conveyors.

54. The combination of claim 53 wherein said conveyors are driven to cause the blades to strip a sheath slug off the wire, said control means including programming means for causing the blades to sever a sheathing slug tail produced in response to said stripping.

55. The method of operating apparatus as defined in claim 54, including
   a) causing said blades to cut the wire and to strip a sheathing slug therefrom, whereby the sheathing slug produces a tail,
   b) causing said blades to cut off said slug tail,
   c) and allowing the slug tail to fall away from the blades.

56. The combination of claim 30 including conveyor means to engage and advance the wire, to be engaged and processed by the blade means, drive means for the conveyor means, and control means operatively connected with the drive means for the blade means and conveyor means to effect displacement of the blade means in timed relation to operation of the conveyor means.

* * * * *

UNITED STATES PATENT AND TRADEMARK OFFICE
CERTIFICATE OF CORRECTION

PATENT NO. : 5,469,763
DATED : November 28, 1995
INVENTOR(S) : Jack L. Hoffa

It is certified that error appears in the above-identified patent and that said Letters Patent is hereby corrected as shown below:

Column 1,
Line 7, -- This application is a continuation-in-part of Ser. No. 08/022,081 filed Feb. 25, 1993, now U.S. Pat. No. 5,375,485, which is a continuation-in-part of Ser. No. 07/857,972 filed Mar. 26, 1992, now U.S. Pat. No. 5,293,683, which is a continuation-in-part of Ser. No. 07/659,557 filed Feb.22, 1991, now abandoned which is a continuation-in-part of Ser.No.07/611,057 filed Nov. 9, 1990, now U.S. Pat. No. 5,146,673 issued Sep. 15, 1992."

should read -- This application is a continuation-in-part of Ser.No.22,981, Feb. 25, 1993, Pat. No.5,375,485, which is a continuation-in-part of Ser.No.857,972, Mar. 26, 1992, Pat.No.5,293,683, which is a divisional of Ser.No.765,986 Pat.No.5,253,555, which is a continuation-in-part of Ser.No.07/659,557, abandoned, which is a continuation-in-part of Ser.No.611,057, Nov.9, 1990, Pat.No.5,146,673. --

Signed and Sealed this

Twenty-eighth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 5,469,763  
DATED : November 28, 1995  
INVENTOR(S) : Jack L. Hoffa Page 1 of 1

It is certified that error appears in the above-identified patent and that said Letters Patent is hereby corrected as shown below:

Title page,
Item [63], Related U.S. Application Data, "Continuation-in-part of Ser.No.22,981, Feb.25, 1993, Pat. No.5,375,486, which is a continuation-in-part of Ser.No.857,972, Mar. 26, 1992, Pat.No.5,293,683, which is a continuation-in-part of Ser.No.659,557, Feb. 22, 1991, abandoned, which is a continuation-in-part of Ser.No.611,057, Nov.9, 1990, Pat.No.5,146,673." should read
-- Continuation-in-part of Ser.No.22,981, Feb. 25, 1993, Pat.No. 5,375,485, which is a continuation-in-part of Ser.No.857,972, Mar.26, 1992, Pat.No.5,293,683, which is a divisional of Ser.No.765,986 Pat.No.5,253,555, which is a continuation-in-part of Ser.No.07/659,557, abandoned, which is a continuation-in-part of Ser.No.611,057, Nov. 9, 1990, Pat.No.5,146,673. --

Signed and Sealed this

Twelfth Day of April, 2005

JON W. DUDAS  
*Director of the United States Patent and Trademark Office*